3,185,581
PROCESS FOR PRODUCING A FRIABLE, READILY RECONSTITUTABLE DEHYDRATED FOOD PRODUCT

Cornelis Kortschot, Lakeland, Fla., assignor to Plant Industries, Inc., Plant City, Fla., a corporation of Florida
No Drawing. Filed Aug. 14, 1962, Ser. No. 216,722
3 Claims. (Cl. 99—206)

This invention relates to dehydrated food products and more particularly to a method of preventing the liquefaction, gumming and caking of friable, high volume-low density natural and synthetic edible products during their production and storage.

While the method set forth in this invention is applicable to any hygroscopic edible product as produced by freeze drying, puff drying, foam mat drying, spray drying or other equivalent means, the term dehydrated fruit juice will be used hereinafter as an example.

Edible products as produced by the processes set forth above are hygroscopic in varying degrees and are subject to liquefaction, gumming, caking and product degradation due to the effects of moisture. These phenomena exhibit a time-temperature relationship; at a high moisture content the products will cake almost instantaneously, at lower moisture contents caking may take place very slowly during an extended period of time. In many cases an in-package desiccant has to be used to reduce the moisture content, even when the products are packed in hermetically sealed containers.

It has been found that dehydrated fruit juices behave as solidified, super saturated solutions in that the melting point or coalescence point of each area or particle of the dehydrated fruit juice is variable and is directly dependent on the amount of moisture contained in the area or associated with the particle.

Because of various reasons, one of them the difference in thickness of the product films during dehydration, another the presence of unsaturated attractive forces on the surface, the product at the end of dehydration cycle contains moisture that is distributed unevenly or non-homogeneously. The dehydrated fruit juice, therefore, has local areas that are more moist and thus have a lower melting or coalescence point than would be indicated by the average moisture content of the product. Sticky spots are formed as areas of higher moisture content product coalesce from a high volume low density "solid" texture to a low volume high density "liquid" texture.

The more moist areas or particles of a fruit juice product that is stored at a temperature even slightly below the average coalescence point of the product as determined by its average moisture content, will coalesce and become sticky, gummy and caked. These coalesced or melted portions stick to product packaging, are unsightly and will not easily dissolve in a reconstituting liquid and therefore detract from the usefulness and aesthetic appeal of the dehydrated fruit juice products.

In commercial processes of dehydration, volatile constituents are removed from the product lowering the flavor level and quality of the dehydrated product so that upon its reconstitution it has a bland, flat taste. Previous processes for handling dehydrated fruit juices have been able to only partially restore or return these flavoring constituents to the product without increasing the moisture content of the dehydrated product to such an extent that coalescence or melting of the product would destroy its value.

It is therefore an object of this invention to provide a method for handling a dehydrated edible product during its production and storage that will prevent its liquefaction, gumming and caking due to melting or coalescence.

It is also an object of this invention to provide a method that will permit the addition of a certain amount of moisture containing water soluble flavor constituents, fruit or other true flavor essences and other moisture containing ingredients without liquefaction, gumming, caking or moisture induced degradation of the product taking place.

These and other objects of this invention will become more apparent during the course of the following detailed explanation and appended claims.

According to a preferred embodiment of this invention the dehydrated fruit juice or other edible product is removed from the dehydrating apparatus in friable, pulverant or particulate form and is placed in an air tight package or enclosure which may contain moisture absorbing or desiccating material. The product, at this stage has a low moisture content but the moisture contained therein is unevenly distributed throughout the product. The product, then, has more moist portions that will coalesce at lower temperatures and drier portions that will not coalesce unless the product is allowed to attain higher temperatures. To prevent the coalescence of any portions of the product it is cooled to a temperature that is substantially below the coalescence point of the most moist or more moist particles of the product.

When the product has been so cooled a minor amount of moisture containing flavoring ingredients such as liquid or solid flavorings, nutritive sweetening agents, anti-caking agents, bodying agents, water soluble fruit essences or water soluble vegetable juice essences may be added if care is taken to hold the temperature of the product below the coalescence point of the most moist areas of the product including that moisture added by the moisture containing flavoring ingredients. The critical temperature below which the product must be kept at this point depends on the method of drying, the characteristics of the particular product and the amount of moisture added in the moisture containing flavoring ingredients and is determined by statistical analysis and laboratory samplings, using ordinary methods.

The product is stored for a period of time at a temperature that is below the coalescence point of the most moist particles or areas of the product. All of the product remains in its "solid" state and the moisture retained by the product begins to distribute itself more uniformly throughout the product under the driving force of the difference in vapor pressures of the more moist and less moist areas of the product. Thus, after a period of time the critical storing temperature of the product, that is, the coalescence point of the most moist portion of the product will have increased. As the moisture distributes more homogeneously throughout the product the storing temperature is gradually or by steps allowed to increase but is always kept below the coalescence point of the more moist portions of the product. The allowing of an increase in storage temperature carries with it a subsequent saving in the cost of depressing the temperature of the product below the ambient or normal storage room temperature.

If the initial total moisture content of the dehydrated product was low enough, the moisture will be distributed throughout the product while its temperature is depressed until the critical temperature, the coalescence point of the more moist portions of the product is above average room or ambient temperature and the temperature of the product can ultimately be allowed to raise to the ambient temperature without danger of any of the product becoming liquefied, gummy or caked. Even if the total moisture content of the dehydrated product is initially so high that the product could not be stored at room temperature after the moisture level of the product was allowed to come to equilibrium during a low temperature pre-conditioning period, according to alternatives of the method of this invention, desiccating or moisture absorbing material are included in the container. Edible moisture absorbing materials may be intimately mixed with the product or a nonedible desiccant may be enclosed in the container, by keeping it separate from the product. The non-edible desiccant is enclosed in a pouch or pillbox permeable to water vapor using methods well known in the prior art. Examples of disiccating and moisture absorbing materials used are high surface area, open cellular solids; anti-caking agents; nutritive sweetening agents; solid flavoring materials and bodying agents. The water that they remove from the product may be adsorbed, absorbed or combined as water of crystallization. When amounts of these inclusions are properly adjusted the moisture content of the most moist portions of the product can be lowered by redistribution and removal during the low temperature pre-conditioning period so that the product can ultimately be stored in hermetically sealed containers, at average room temperatures without the product becoming liquefied, gummy or caked.

During experimentation with dehydrated pineapple juice crystals it was discovered that dehydrated pineapple juice crystals containing an amount of moisture so high that the product would coalesce at room temperature, can be conditioned at low temperature for a period of time and thereafter, returned to room temperature while still containing the same amount of moisture. As the temperature of the product increases, there is some softening but after a short period of time all the crystals become hard and friable although they still contain the initial amount of moisture. The moisture most probably is absorbed by the fruit juice crystals themselves as water of crystallization.

These results were quite unexpected, since it had been previously believed that the only factors controlling caking were moisture content and temperature. It now appears that through the correct programming of temperature, pineapple and some other dehydrated fruit juice crystals can be induced to absorb the moisture by crystallizing. This mechanism is profitably taken advantage of in the process of this invention.

In addition to the inclusion of disiccating or moisture absorbing material in the product enclosure during the low temperature pre-conditioning period, or as an alternative therefore a dry gas, which most economically is dry air at atmospheric pressure, is passed into intimate contact with the product.

The temperature of the dry gas must be programmed in such a way that the temperature of the product is below the point of coalescence. In this embodiment of the invention, it is not necessary to condition the material before drying with the dry gas takes place, provided the gas temperature is below the temperature below the temperature at which the product will coalesce. The dry gas removes so much moisture from the product that the product may be put in hermetically sealed packages, which may contain a desiccant, and brought to room temperature without further low temperature pre-conditioning and without danger of liquefaction, gumming, caking or product degradation.

This embodiment of the invention includes in its prospect processes wherein the dehydration is carried out in two steps. In presently used fruit juice dehydrating systems, dehydration takes place in one dryer where the dehydration is carried to completion, that is, the product is dried to a moisture content at which it can be handled at room temperature. There are certain advantages in using two steps. A dryer used for the first step is by necessity a two-dimensional system such as a belt dryer, which according to the two step embodiment produces a product at low temperature and relatively high moisture content. At this point the product must be kept cold at all times for the reasons set forth hereinabove. The second step of the dehydration then dries the product to the same moisture content that is presently used in the art, the advantage being that since the second dryer utilizes a solid product the material can be handled in a three-dimensional system, such as a fluidized bed which greatly reduces the size and therefore the cost of the equipment and the plant space occupied thereby.

Because moisture is redistributed and/or removed from the product during its pre-conditioning, low temperature storage period according to the method set forth, a product which has higher total moisture content upon leaving the initial dehydration process can be used than was heretofore possible. Being able to terminate the dehydration process at a higher moisture content reduces the period that the product has been in the so-called "falling rate region" of the drying cycle wherein the amount of drying or dehydration done per unit of energy expended is decreasing and the temperature of the dehydrated material is increasing sharply. The maximum temperature that will be obtained by the product having been dehydrated less in the falling rate region will be consequently lower thereby giving a product whose true flavors have been less distorted by high temperature degradation.

The following is an illustrative example showing some of the advantages of the method of this invention:

*Example*

A puff drying process for pineapple juice as known in the prior art consisted of dehydrating the juice in a continuous high vacuum belt dehydrator to give an end product of 2.0 to 2.5 percent average moisture content. The dehydrated juice was extremely hygroscopic and had to be handled in a dehumidifying atmosphere of 15 percent relative humidity or less, at a temperature below 75° F. The product was packaged in hermetically sealed containers at 2 to 2½ percent average moisture content with a desiccating pouch to provide in package desiccation to reduce moisture content below 1 percent. No commercial means of addition of natural flavoring essence was satisfactory and the product often caked, produced sticking spots or gummy spots due to the melting or coalescing of the more moist portions of the product before the average moisture level had been reduced sufficiently by the desiccant.

According to the method of this invention it is possible to dehydrate pineapple crystals to an average moisture content of 2½ percent, lower the temperature of the product to 0° F. or below and add an amount of pineapple essence solution containing moisture in the amount of 1 percent by weight of the dried pineapple juice crystals. As the moisture content of the more moist areas of the pineapple crystal product is reduced by transfer of moisture to desiccants and moisture absorbing ingredients included in the product package and the evening out of the moisture content among the several crystals, the storing temperature of the superior, full flavored pineapple crystals product may be gradually raised to average room temperature. This product when stored at room temperature remains friable and can be readily reconstituted to pineapple juice of improved quality and flavor and characteristics.

Having set forth an embodiment of the invention in the foregoing detailed description to illustrate the principles of the invention it will be realized that many modifications are possible that are within the anticipation thereof and therefore the extent of the invention is limited only by the intent and scope of the following claims.

What is claimed is:

1. A method for preparing a friable, readily reconstitutable dehydrated product from an edible juice comprising: expanding and drying the juice to an average moisture content of about 2.5 percent by weight; depressing the temperature of the intermediate product thus formed to at least as low as 0° F.; adding a moisture containing essence solution in an amount sufficient to increase the moisture content of said product about 1.0 percent by weight; packaging said product in contact with a material having as an important characteristic the capacity to absorb a substantial quantity of moisture; maintaining said package product at a temperature in the range between 0° F. and less than room temperature until such time that so large a percentage of the moisture in said product has been absorbed by said material that the product will remain friable if warmed to room temperature; and then raising the temperature of the product to room temperature for storage.

2. A method as set forth in claim 1 wherein said material having as an important characteristic the capacity to absorb a substantial quantity of moisture is one chosen from the group consisting of: a non-edible desiccant enclosed in a container, an anti-caking agent, a nutritive sweetening agent, a solid flavoring material, a bodying agent, and dehydrated fruit juice crystals.

3. A method as set forth in claim 1 additionally comprising the step of directing a stream of dry gas into intimate contact with the product subsequent to the moisture containing essence solution adding step and prior to the packaging step to further dehydrate said product.

References Cited by the Examiner
UNITED STATES PATENTS

| | | | |
|---|---|---|---|
| 2,656,276 | 10/53 | Toulmin | 99—199 |
| 2,846,319 | 8/58 | Kelly | 99—205 |
| 2,854,343 | 9/58 | Strashun et al. | 99—206 |
| 2,901,356 | 8/59 | Gallotti | 99—205 X |
| 2,929,717 | 3/60 | Eskew | 99—206 X |
| 2,959,486 | 11/60 | Strashun et al. | 99—206 |
| 3,093,488 | 6/63 | Graham et al. | 99—199 |

A. LOUIS MONACELL, *Primary Examiner.*

ABRAHAM H. WINKELSTEIN, RAYMOND N. JONES, *Examiners.*